(12) United States Patent
Lee et al.

(10) Patent No.: US 7,871,040 B2
(45) Date of Patent: Jan. 18, 2011

(54) COMPOSITE AIRCRAFT STRUCTURES WITH HAT STIFFENERS

(75) Inventors: Shin S. Lee, Bellevue, WA (US); Adrian Viisoreanu, Kent, WA (US); William J. Koch, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 632 days.

(21) Appl. No.: 11/558,735

(22) Filed: Nov. 10, 2006

(65) Prior Publication Data

US 2008/0111024 A1 May 15, 2008

(51) Int. Cl.
*B64C 1/12* (2006.01)
(52) U.S. Cl. ........................................................ 244/119
(58) Field of Classification Search .................. 244/119, 244/123.1, 120, 123.3; 188/378
See application file for complete search history.

(56) References Cited

U.S. PATENT DOCUMENTS

| | | | | |
|---|---|---|---|---|
| 4,416,349 A | * | 11/1983 | Jacobs | 181/208 |
| 4,425,980 A | * | 1/1984 | Miles | 181/208 |
| 4,635,882 A | * | 1/1987 | SenGupta et al. | 244/119 |
| 4,804,132 A | * | 2/1989 | DiFrancesco | 228/115 |
| 4,811,540 A | | 3/1989 | Kallies et al. | |
| 5,242,523 A | * | 9/1993 | Willden et al. | 156/285 |
| 6,427,945 B1 | * | 8/2002 | Bansemir | 244/129.1 |
| 6,458,309 B1 | | 10/2002 | Allen et al. | |
| 6,613,258 B1 | * | 9/2003 | Maison et al. | 264/102 |
| 7,513,769 B2 | * | 4/2009 | Benson et al. | 425/374 |
| 7,527,222 B2 | * | 5/2009 | Biornstad et al. | 244/120 |

FOREIGN PATENT DOCUMENTS

| | | |
|---|---|---|
| EP | 0 248 161 A | 12/1987 |
| FR | 2 333 644 A | 7/1997 |
| WO | WO 02/083389 A | 10/2002 |

* cited by examiner

*Primary Examiner*—Tien Dinh
(74) *Attorney, Agent, or Firm*—Haynes & Boone, LLP.

(57) ABSTRACT

A composite panel structure for an aircraft includes a plurality of annular, hat-shaped frames disposed coaxially along a long axis of the aircraft in a spaced, parallel relationship, an inner skin having an inner surface bonded to an outer surface of the hat frames, a plurality of elongated, hat-shaped stringers disposed in a longitudinal direction along an outer surface of the inner skin in a spaced, parallel relationship, a solid or rigid foam offset bonded to an outer surface of each of the stringers, and an outer skin having an inner surface bonded to an upper surface of each of the offsets. The inner skin carries the loads of the structure and the outer skin defines an aerodynamic surface of the aircraft and provides impact and lighting protection. The frames, inner skin and stringers are formed on a single forming tool and cured and bonded with each other simultaneously.

15 Claims, 3 Drawing Sheets

COMPOSITE AIRCRAFT STRUCTURES WITH HAT STIFFENERS

BACKGROUND

The present disclosure relates to composite aircraft structures, such as fuselages, in general, and in particular, to composite aircraft structures incorporating closed hat stiffeners that enable the thickness of the skins of the structures to be minimized while providing acceptable levels of impact resistance and damage tolerance, thereby reducing the weight and cost of such structures.

Composite aircraft structures offer many substantial advantages for the commercial aircraft industry. Several design considerations are critical to a successful and safely designed composite aircraft structure. Two of those design considerations, impact resistance and damage tolerance, are critical driving factors for weight and cost. Because of these two design requirements, composite fuselage skin structures may utilize a minimum gage that is much thicker than needed for carrying vehicle loads.

In general, closed "hat" stiffeners provide great torsion rigidity, bending stiffness, and buckling resistance in composite structures for airplane applications, such as fuselages. Closed hat-stiffened composite structures typically offer lighter structural weight with less material and manufacturing cost compared with "open" hat sections or J section stiffeners such as are typically used for frames. However, prior art hat-stiffened structure concepts only allow for hat stiffeners extending in the fore-aft direction, and stiffeners extending in the other direction must be designed, fabricated, and assembled altogether differently.

For example, the frames and shear ties on one composite bodied aircraft must be cured in two separate processes and then fastened together with a large number of fasteners. The frames are currently made using a form of "resin transfer molding," while the shear ties are a tape laminate, which entails cutting to shape, drape forming, and autoclaving to cure. As a result, extra weight, cost, manufacturing processes, and assembly time are added to the structure and overall production cost. With the current design, the so-called "fail-safe chord" of the frame is suspended slightly above the skin by means of the shear ties. The shear ties have cutouts at stringers to provide for stringer continuity. In case of a skin crack, the fail-safe chord provides an alternative load path for the hoop loads in the areas where the frame passes over the stringer, but is not as effective as it would be if tied directly to the skin. In the current design, the frame load path is thus not optimal to insure the stringer continuity.

What is needed, then, is a composite panel structure design in which the stringers and frames do not intersect each other on the same side of the structural skin, thereby creating an optimal load path for both frame and stringers. This also eliminates the need for shear ties and stringer holes at the stringer-frame intersections and minimizes the number fasteners needed at each stringer-frame intersection for fail-safety.

BRIEF SUMMARY

In accordance with the exemplary embodiments thereof described herein, the present invention provides a composite panel structure for an aircraft and methods for making it that overcome the above and other problems of the prior art, and that enable the thickness of the skins of the structures, such as the fuselage of a composite bodied aircraft, to be minimized while providing an acceptable levels of impact resistance and damage tolerance, thereby reducing both the weight and the cost of such structures.

In one particular exemplary embodiment thereof, the composite aircraft panel structure comprises a plurality of annular frames disposed coaxially along a long axis of the aircraft in a spaced, parallel relationship, each having a hat shaped cross section, an inner skin having an inner surface bonded to an outer surface of the hat frames, a plurality of elongated stringers disposed in a longitudinal direction along an outer surface of the inner skin in a spaced, parallel relationship, each also having a hat shaped cross section, an offset bonded to an outer surface of each of the stringers, and an outer skin having an inner surface bonded to an upper surface of each of the offsets.

Each of the annular frames comprises a circumferential inner chord, a pair of circumferential risers, each extending at an angle from a respective opposite side of the inner chord, and a pair of circumferential flanges, each extending longitudinally from an outer end of a respective riser and in a direction opposite to the other flange. The inner surface of the inner skin of the panel structure may be bonded to an outer surface of each of the circumferential flanges of each frame.

The general form, but not necessarily the size, of the stringers may be similar to that of the frames. Thus, each stringer comprises a longitudinal outer chord, a pair of longitudinal risers, each extending at an angle from a respective opposite side of the outer chord, and a pair of longitudinal flanges, each extending circumferentially from an inner end of a respective riser and in a direction opposite to the other flange. The above offsets are respectively bonded to an outer surface of the outer chord of respective ones of the stringers.

In one preferred exemplary embodiment of the composite panel structure, the inner skin functions to carry substantially the entire design load of the structure, whereas, the outer skin functions as the aerodynamic surface of the aircraft, to provide impact resistance, e.g., to hail impact, and to protect the aircraft against lightning strikes.

The offsets that are bonded to the outer surfaces of the stringer outer chords each comprises a rigid, closed-cell foam material, such as Rohacell, or alternatively, a solid, high loss factor polymer material. The offsets may comprise a uniform thin layer, or alternatively, incorporate a web-like pattern. In one alternative embodiment, the offsets may further comprise a plurality of columns disposed between the stringers and having opposite ends, at least one of which may be bonded to an adjacent one of the inner and the outer skins with an adhesive. In one exemplary embodiment, the offsets are bonded to the stringers, and the outer skin may be bonded to the offsets with a cold-bonding adhesive.

In a preferred exemplary embodiment of the panel structure, the longitudinal flanges of the stringers overlap circumferential flanges of the hat frames on opposite sides of the inner skin at a plurality of locations thereon, and a fastener, such as a Ililok fastener, may be installed through the overlapping flanges and the inner skin at each such location to fasten them together.

In one preferred exemplary embodiment, a layer of fiberglass insulation, e.g., fiberglass bats, may be inserted between the inner and outer skins and adjacent pairs of the stringers for noise and thermal insulation.

Since the outer skin of the panel structure may be non-structural, in one advantageous embodiment, damage to the outer skin can be easily repaired by simply removing the damaged portion of the outer surface of the skin, e.g., with a saw, and cold-bonding a patch to the skin in place of the removed portion.

An exemplary embodiment of a method for making a composite panel structure for an aircraft in accordance the present invention comprises providing a segmented internal mold line (IML) tool containing a plurality of spaced, parallel, circumferential grooves, each adapted to form a respective one of a plurality of annular hat frames therein. A plurality of layers of a prepreg tape may then be wound in each groove of the tool to form an uncured hat frame therein. After the hat frames are wound, a "fly-away" mandrel, i.e., one that remains in place after the structure is cured, may be placed in the cavity of each of the hat frames.

A plurality of layers of a prepreg tape are then wound over the tool, hat frames and mandrels to form an uncured composite inner skin that is disposed in contact with the circumferential flanges of the hat frames at a co-cured bond line. A plurality of spaced, parallel, longitudinally extending mandrels for forming hat stringers are located on an outer surface of the uncured inner skin, and a plurality of layers of a prepreg tape are then laid over each of the hat stringer forming mandrels to form an uncured hat stringer thereon, each of which has a pair of oppositely directed longitudinal flanges thereon that are disposed in contact with the outer surface of the inner skin at a co-cured bond line. The tool and the assembly of uncured hat frames, inner skin and hat stringers are then heated, e.g., in an autoclave, to cure the resin in the respective prepreg tapes thereof and to bond the respective flanges of the hat frames and stiffeners to the inner skin.

After the above structure is cured, fasteners are installed in each of the locations at which the longitudinal flanges of the stringers overlap the circumferential flanges of the hat frames on opposite sides of the inner skin. An offset may then be bonded onto the outer surface of the outer chord of each of the hat stringers, and the inner surface of an outer skin may be bonded to an upper surface of each of the offsets, which may be effected by winding it over the offsets, or alternatively, by bonding a plurality of previously cured outer skin panels to the offsets.

A better understanding of the above and many other features and advantages of the novel composite aircraft structures and the methods for making them of the present invention may be obtained from a consideration of the detailed description below of some exemplary embodiments thereof, particularly if such consideration is made in conjunction with the appended drawings, wherein like reference numerals are used to identify like elements illustrated in one or more of the figures thereof.

DETAILED DESCRIPTION

Figure 1:
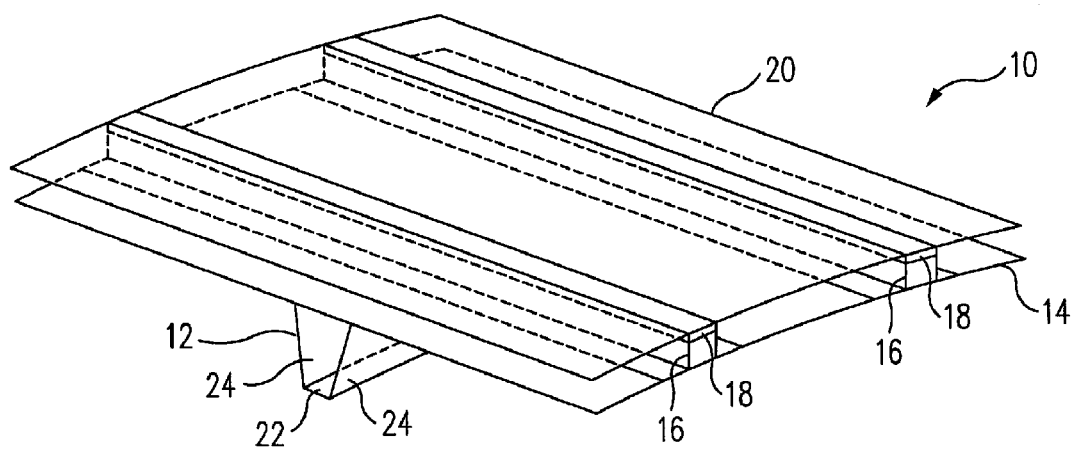
FIG. 1 is an upper front and side perspective view of a section of an exemplary embodiment of a composite panel structure for an aircraft in accordance with the present invention.
Figure 2:
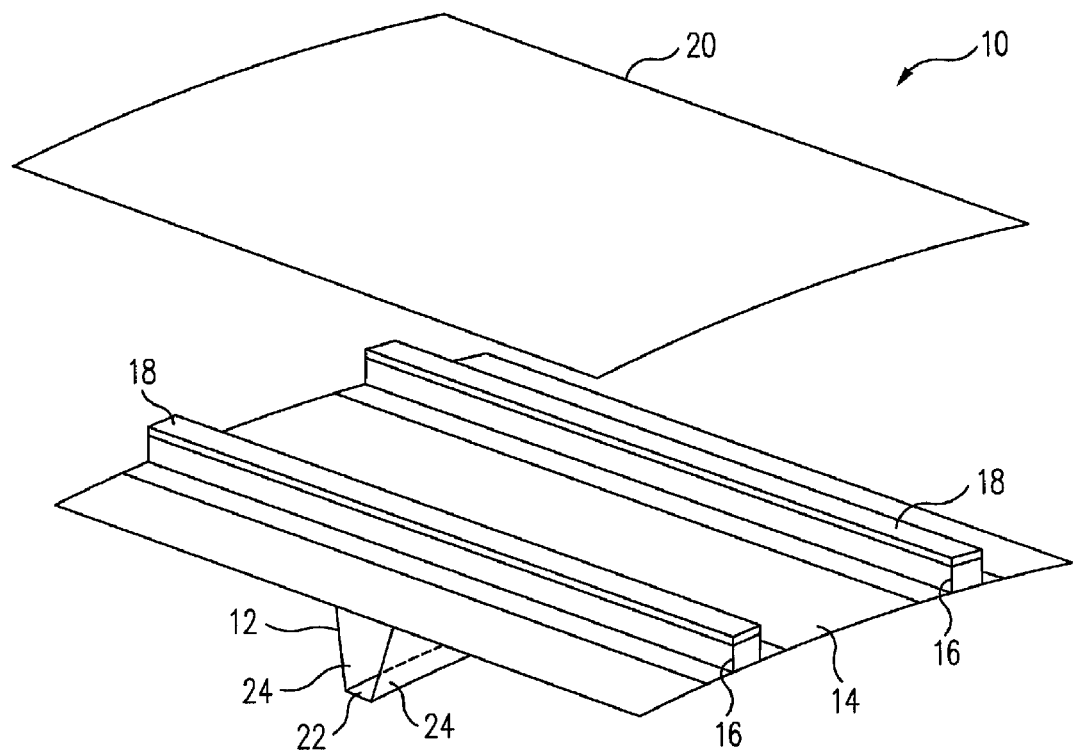
FIG. 2 is a partially exploded view of the exemplary composite panel structure section of FIG. 1, in which an outer or secondary skin has been pulled away to reveal the underlying structural elements.
Figure 3:
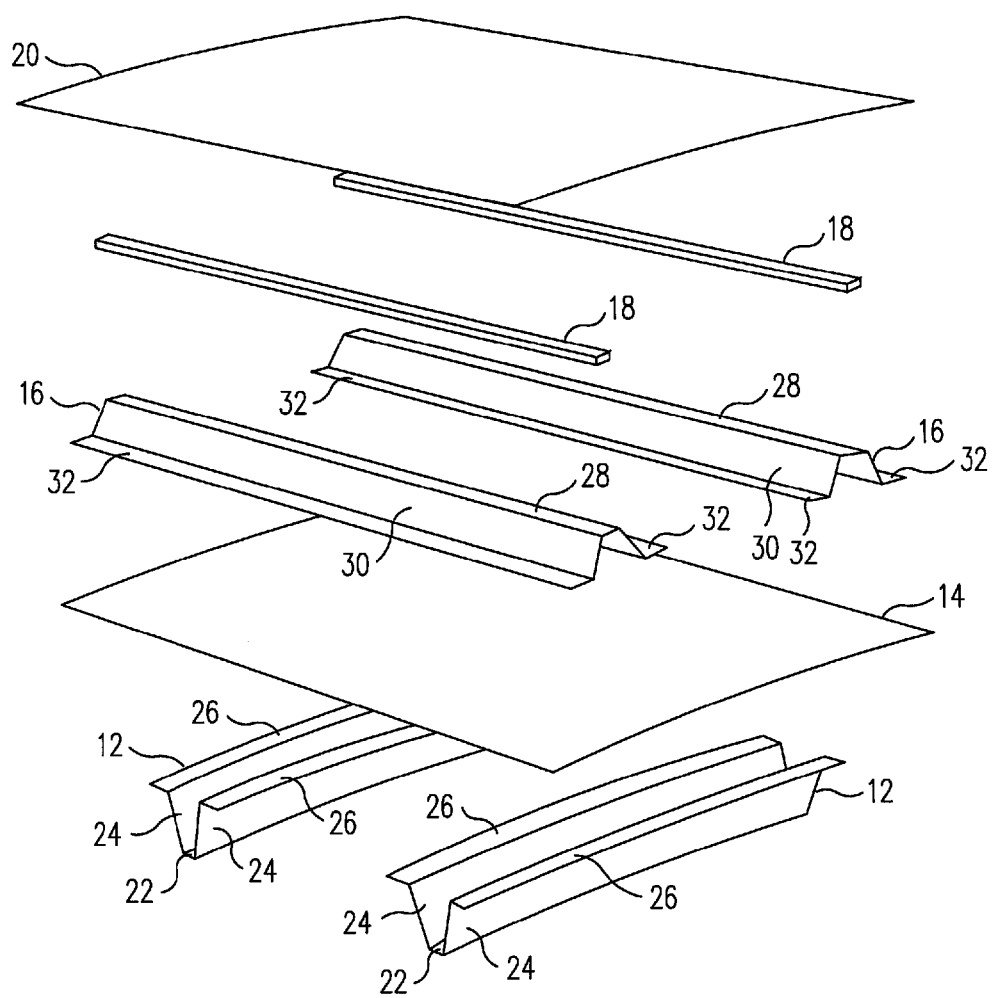
FIG. 3 is a fully exploded view of the exemplary panel structure section.
Figure 4:
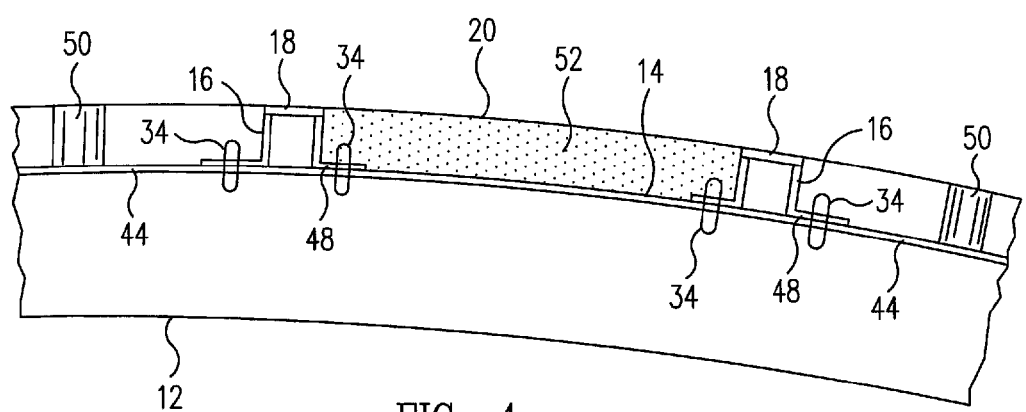
FIG. 4 is a partial cross-sectional end view of the panel structure section; and, FIG. 5 is a perspective view of a section of an Internal Mold Line (IML) tool used in an exemplary embodiment of a method for making a composite panel structure in accordance with the present invention.

FIGS. 1-3 are unexploded, partially exploded and fully exploded upper front and side perspective view of a section of an exemplary embodiment of a composite panel structure 10 for aircraft in accordance with the present invention, respectively, and FIG. 4 is a cross-sectional end view of the panel structure section. Referring to FIGS. 1-4, the composite aircraft panel structure 10 comprises a plurality of annular frames 12 disposed coaxially along a long axis of the aircraft in a spaced, parallel relationship, each having a hat shaped cross section, an inner skin 14 having an inner surface bonded to an outer surface of the hat frames, a plurality of elongated stringers 16 disposed in a longitudinal direction along an outer surface of the inner skin in a spaced, parallel relationship, each also having a hat shaped cross section, an offset 18 bonded to an outer surface of each of the hat stringers, and an outer skin 20 having an inner surface bonded to an upper surface of each of the offsets.

Referring to FIG. 3, each of the annular hat frames 12 comprises a circumferential inner chord 22, a pair of circumferential risers 24, each extending at an angle from a respective opposite side of the inner chord, and a pair of circumferential flanges 26, each extending longitudinally from an outer end of a respective riser and in a direction opposite to the other flange. The inner surface of the inner skin 14 of the panel structure may be bonded to an outer surface of the circumferential flanges 26 of the hat frames.

As illustrated in, e.g., FIG. 3, the hat stringers 16 are similar in form but not necessarily in size to the hat frames. Each stringer comprises a longitudinal outer chord 28, a pair of longitudinal risers 30, each extending at an angle from a respective opposite side of the outer chord, and a pair of longitudinal flanges 32, each extending circumferentially from an inner end of a respective riser and in a direction opposite to the other flange. Each offset 18 may be respectively bonded to an outer surface of the outer chord 28 of a respective one of the stringers, as illustrated in FIG. 2.

As also illustrated in FIG. 2, the longitudinal flanges 32 of the hat stringers 16 overlap the circumferential flanges 26 of the hat frames 12 on opposite sides of the inner skin 14 at a plurality, viz., four, locations per stringer-frame intersection, and a fastener 34 may be installed through the respective overlapping flanges and the inner skin at each such location to hold them together.

Thus, as may be seen by reference to the figures, the above composite panel structure 10 incorporates three primary structural components, viz., orthogonal longitudinal and circumferential hat-stiffeners 12 and 16, an inner, "structural" skin 14, and an outer, "functional" skin 20, the respective functions of which are discussed in more detail below. The panel design thus contemplates integrated hat-stiffener reinforcement in both longitudinal and circumferential directions, an internal structural skin layer, and a functional external or outer skin layer.

The outer or secondary skin 20 may be designed to incorporate an efficient aerodynamic property, such as that required in an aircraft fuselage, and uses selected fiber and resin systems that provide substantial impact resistance. The inner skin 14 and the stiffeners 12 and 16 are designed to carry vehicle design loads. As described in more detail below, this design provides for better structural efficiency and simpler tooling and assembly processes. It also provides a simple and integrated methodology for designing and building hat-stiffeners in both longitudinal (i.e., stringer) and circumferential (i.e., frame) directions.

Figure 5:
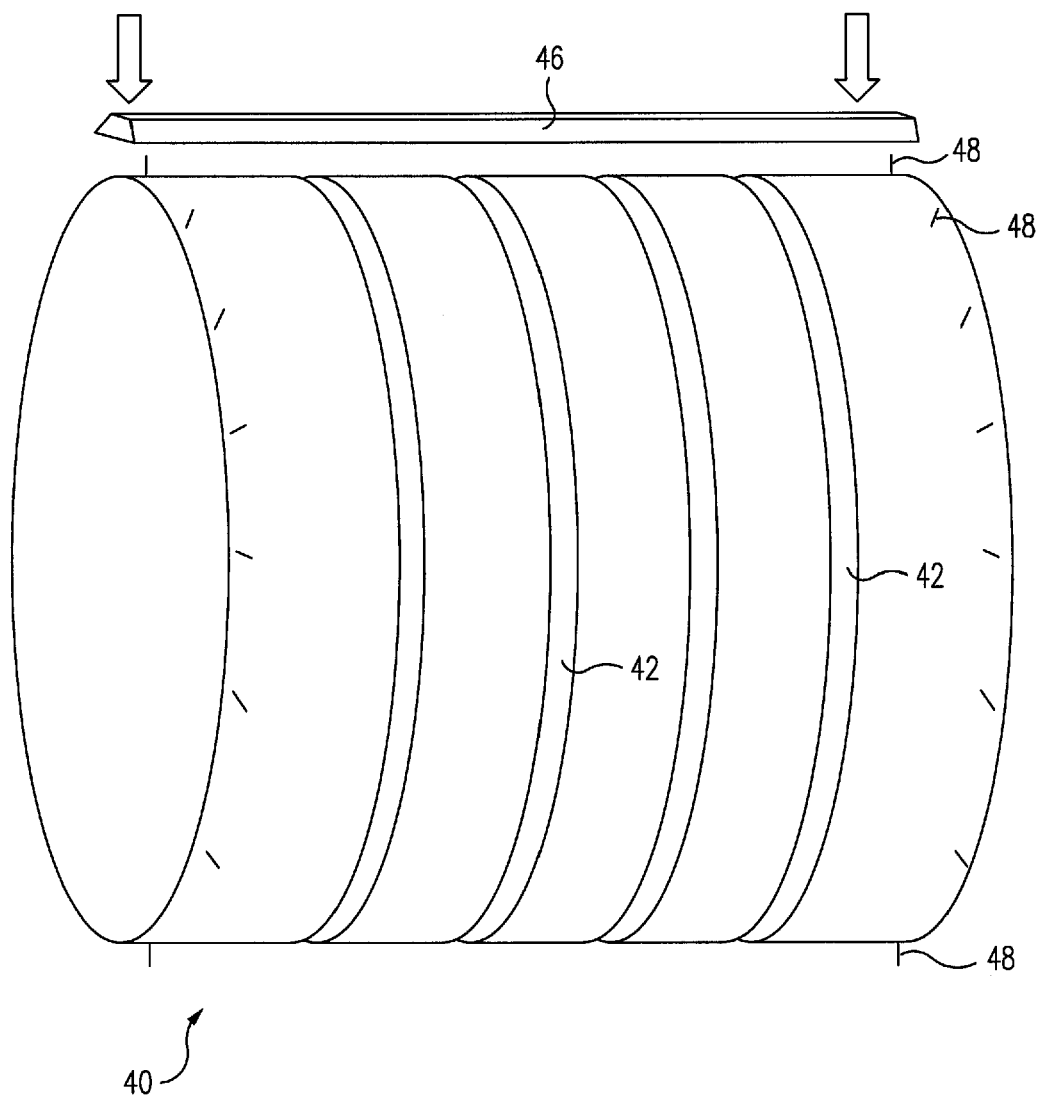

An exemplary embodiment of a method for constructing the co-cured panel structure is described below in connection with FIG. 5. As illustrated in FIG. 5, a segmented (i.e., for ease of removal) Internal Mold Line (IML) tool 40 can be provided that contains a plurality of circumferential grooves 42 adapted to form respective ones of the hat frames 12 therein. In one exemplary embodiment, each circumferential groove of the tool may be wound alternately with "zero degree prepreg" tape in the inner and outer chords (i.e., at the innermost part of the groove and on either side thereof) and "±45 degree fabric prepreg" tape or tri-axial braid. However, other tape angle combinations may also be used.

As used herein, the term "prepreg" refers to a woven or braided fabric or cloth-like tape material, e.g., fiberglass or carbon fibers, that has been impregnated with an uncured or partially cured resin, which is flexible enough to be formed into a desired shape, then "cured," e.g., by the application of heat in an oven or an autoclave, to harden the resin into a strong, rigid, fiber-reinforced structure. The angular modifier, i.e., "0 degrees," "90 degrees" and "±45 degrees" refers to the principal orientation of the fibers in the tape relative to the long direction thereof. Thus, in 0 degree prepreg tape, the fibers are disposed parallel to the long direction of the tape, in 90 degree tape, they are perpendicular to the long direction, and in ±45 degree tape, they are oriented at either plus or minus 45 degrees with respect to the long direction of the tape.

The ±45 degree tape or braid forms the side-walls 24 and flanges 26 of the hat frame stiffeners 12 and may be used in those locations to prevent wrinkling. The hat frame stiffeners therefore comprise laminations of alternating zero and ±45 degree prepreg. Current manufacturing techniques generally effect this operation by hand. However, a roller (not illustrated) that fits into the respective grooves 42 can be fabricated to follow the head that dispenses the prepreg tape, thereby automating the process.

After the hat frames 12 are formed up on the tool 40, so-called "fly-away" mandrels (not illustrated) are placed in each of the circumferential cavities of the hat frames. These mandrels are simply inflated, thin-walled plastic bags that are commonly used in the manufacture of certain military structures. Unlike the inflatable rubber mandrels currently used in composite aircraft constructions, these mandrels are left in place and remain permanently in the structure after it is cured. During the cure process, the mandrels function much like inflatable rubber mandrels and serve to provide pressure inside the stringers which prevents collapse of the stringers.

The forming tool 40 may then be wound over its entire outer surface with the composite inner or structural skin 14 layer, which may be wound in direct contact with the outer surfaces of the hat frame flanges 26 at a co-cured bond line 44, as illustrated in FIG. 4. Aluminum hat stringer forming mandrels 46 are then slid onto radial locator pins 48 located at the ends of the stringers. As illustrated in FIG. 5, these locator pins are disposed around the perimeter of the tool such that the mandrels are disposed in contact with the outer surface, i.e., the Outer Mold Line (OML) of the structural skin 14. In an alternative embodiment, this procedure can include the application of a "wrap" ply and "noodle" on the aluminum mandrels just prior to their installation. The addition of a wrap ply increases bond strength. After cure, the locator pins 48 are extracted and the aluminum mandrels 46 can be withdrawn from the stringers. Since aluminum has a high coefficient of thermal expansion relative to carbon, the mandrels can be extracted easily after the part has cooled.

Alternating bands of zero degree and ±45 degree prepreg tape are then placed over the stringer forming mandrels 46 to form the hat stringers 16, which are formed such that the lower surfaces of their respective longitudinal flanges 32 are formed in direct contact with the outer surface of the inner structural skin 14 at a second co-cured bond line 48, as illustrated in FIG. 4. As in the lay-up of the hat frames 12 described above, placement of the zero and ±45 degree tapes can be automated by the provision of, in this case, a grooved roller (not illustrated) that follows the tape applicator head. After the hat stringers 16 are laid up, the assemblage may then be bagged and autoclaved to cure the resin of the tapes of the hat frames, stringers and the inner skin and skins and to bond these elements together at the respective co-cured bond lines 44 and 48 described above.

As those of skill in the art will appreciate, aluminum mandrels 46 expand during the cure process, and are thus easily extractable from the structure after it has cooled and the mandrels contract. However, an alternative to using aluminum mandrels (for example, if the structure incorporates substantial fore-and-aft curvature) is to pre-cure the hat stringers 16, insert a fly-away mandrel within each of them, locate them on the inner structural skin 14 in a manner similar to that described above, and then co-bond them to the inner skin, as above.

After the "inner" structure is cured, the intersections of the respective flanges of the hat stringers 16 and frame 12, and if desired, at additional fail-safe locations, are drilled and a fastener 34 may be installed at each such location, as illustrated in FIG. 4. It should be noted that the fasteners do not need to be countersunk, since they are not located on an aerodynamic surface of the structure 10. Thus, "buttonhead" or other types of non-countersunk fasteners can be used to enable sizing of the minimum gage of the structural skin 14 appropriately to the body loads, rather than sizing it for "knife-edge" requirements. As a result, far fewer fasteners are needed than are required in current composite aircraft structures. Further, it should be understood that, if sufficient bond strength and reliability can be obtained, the need for fasteners 34 may be entirely eliminated.

As illustrated in, e.g., FIG. 4, an offset 18, preferably made of either a rigid, closed-cell foam material, such as Rohacell, or a high loss factor polymer, may then be "cold-bonded," i.e., using an appropriate adhesive that cures at a low or room temperature, to the outer chord 28 of each of the hat stringers 16. In one particular exemplary embodiment, the offsets provide at least 0.2 inch of offset and energy absorption, should an impact, e.g., from a rock or hail, occur directly on a stringer outer chord. At a minimum, the offsets can simply comprise a plurality of longitudinal strips of the offset material bonded on the stringer outer chords. However, it is also possible that it may be desirable in some applications to incorporate additional foam material between the skins 14 and 20 and the stringers 16 to reduce vibrations and sonic fatigue of the outer skin 20.

Thus, as illustrated in FIG. 4, in one alternative exemplary embodiment, this additional offset material can comprise a plurality of cylindrical columns 50 having inner ends that are respectively cold-bonded to the inner, structural skin 14 at selected locations between the hat stringers 16. If desired, the outer ends of the columns can also be cold-bonded to the secondary skin 20. Additionally, for purposes of thermal and noise insulation, fiberglass batting 52 can also be installed between the hat stringers.

After the offsets 18 are bonded in place, the protective outer or secondary skin 20 may then be either automatically wound on, or bonded in panelized sections to, the upper surfaces of the offsets. Since the outer skin is non-structural, repairs to it can be effected easily and simply, e.g., by cutting 0.1" of the skin away, e.g., with a saw, and then cold-bonding a patch over the removed section.

The composite panel structure 10 of the present invention provides a solution for many of the problems of prior art composite aircraft structures by the provision of stiffeners, preferably, but not limited to, hat stiffeners, i.e., hat stringers 16 and hat frames 12, extending generally perpendicularly to each other on opposite sides of a structural skin 14, and either co-bonded or cocured with the skin, and a second, functional skin 20 disposed on the upper chords 28 of the outer or hat stringer stiffeners 16 to provide protection against impact damage and lightening. This arrangement eliminates the need for shear ties or "mouse-holes" at the stringer-frame intersections because the stringers and frames do not intersect on the same side of the structural skin 14. In addition to being bonded, the frame and stringer flanges 26 and 32 are also fastened to each other through the structural skin 14 with a minimum of four fasteners 34 at each intersection for fail-safety. Of course, additional fasteners can be added between the intersections as needed to maintain a fail-safe structure.

The hat stringers 16 are both bonded and fastened to the Outer Mold Line (OML) of the inner, structural skin 14, whereas, the outer or secondary skin 20 may be bonded to the closed cell foam or high loss factor polymer offsets 18 disposed on the hat stringer outer chords 28. The outer skin 20 comprises a thin, lightweight structure that effects several functions, viz., as the aerodynamic surface, e.g., of an aircraft fuselage, as an impact resistor, e.g., against hail, and as a lightning protector for the aircraft. Because this surface is non-structural, the repair requirements for it are considerably less stringent than for the structural skin, and accordingly, simple cold bonded patches in the form of a repair kit can be used to repair any damage to it.

The offsets 18, which may be made of either a rigid, closed-cell foam, such as Rohacell, or a high loss factor polymer (for vibration reduction), are used both to offset the secondary skin 20 from the underlying structure and to provide additional stiffness in areas subject to sonic fatigue or vibrations. The foam or polymer of the offsets may be provided in the form of either a web-like pattern or a uniform thin layer, depending upon the particular requirements at hand. However, if a foam material is used, it should be protected from water absorption with a thin plastic film, such as Teflon or Mylar. The foam or polymer offsets also serve to protect the hat stringer outer chords 28 from impact damage, and accordingly, can be made thicker in those areas. The volumes between the stringers are preferably filled with a fiberglass insulation 52 for thermal and noise protection. Fiberglass is both lighter and less expensive than a foam insulation, and additionally, does not absorb water, and accordingly, is currently the insulation of choice on many airplanes.

As will be appreciated by those of skill in the art, incorporating the novel hat stiffened composite panel structure 10 of the present invention into, e.g., the fuselage of a composite bodied aircraft, results in a number of substantial benefits: First, the reduction of the minimum gage thickness made possible by the panel design enables the weight of the overall structure to be reduced significantly. As discussed above, the outer skin 20 acts as a compliant impact barrier. In order to absorb, e.g., an impact of 500 in-lb with a structure that deflects only 0.1", the structure would be required to absorb 5000 lb (i.e., 500 in-lb/0.1 in.). However, if the structure is allowed to deflect, e.g., 1.0 inch (i.e., the depth that the stringer offsets the secondary skin 20 from the structural skin 14) the structure is required to absorb only 500 lb of load.

In one advantageous exemplary embodiment, the outer, or secondary skin 20 needs to include no more than two plies of fabric oriented at 0/90 degrees and ±45 degrees, respectively. Of course, many other configurations are possible. It should also be noted that the secondary skin is not required to absorb all of the impact force. That is, it needs only to reduce the intensity of the impact such that no permanent damage occurs to the structural skin 14. Additionally, the impact resistance of the secondary skin 20 can be further enhanced by the provision of fiberglass insulation 52 between the two skins. Additionally, the outer chord 28 of each hat stringer 16 may be protected by the crushable foam or polymer offset 18 bonded between the outer chord and the outer skin.

In one particular alternative embodiment, the foam or polymer strip offsets 18 can be provided with some additional zero degree plies that define a rigid "plank" disposed just below the secondary skin 20. The stiffness of this plank can be adjusted so as to cause it to crush upon impact and thereby absorb a desired amount of impact energy.

The panel structure 10 also enables the utilization of stiffeners extending in multiple directions, i.e., orthogonally to each other. Current composite aircraft frames are vulnerable to rolling because of their offset neutral axis and thin open sections. Closed sections are stiffer, more stable, more resistant to buckling, and more effective for an equivalent section depth. The tight coupling achieved between the hat stringers 12 and 16 and the structural skin 14 also enhances the resistance of fuselage panels to buckling.

The panel structure 10 also enables the number of fasteners 34 used to be dramatically reduced relative to current composite panel fabrication designs. Current methods involve drilling and installing, e.g., Hilok fasteners, at one-inch intervals along the frame/shear-tie and sheartie/skin interfaces. This results in approximately 18 fasteners being installed along each frame per 9 inch stringer bay. The composite panel of the present invention enables this number to be significantly reduced. In particular, since both the hat frame flanges 26 and the hat stringer flanges 32 are directly adjacent and bonded to the inner skin 14, their effectiveness in stopping a 2-bay crack enables fewer fasteners to be used to provide the equivalent fail-safe strength. Additionally, since there is no shear tie in the novel composite structure, the frame/shear-tie row of fasteners can also be eliminated, thereby resulting in at least a 50% reduction in the number of fasteners required in the structure.

The panel structure 10 also eliminates aerodynamic drag losses due to "pressure pillowing" and the need for fastener heads. Pressure pillowing results when internal fuselage pressure exceeds external pressure and causes panel sections to bulge out, or "pillow," detrimentally to the aerodynamic shape of the fuselage, and is another design requirement that dictates a thicker minimum gage on some aircraft. Since only the structural skin 14 is pressurized in the panel structure of the present invention, the secondary skin 20 remains free of pressure pillows that cause excrescence drag. Fastener heads and lap splices, also fecund sources of parasitic drag, are also completely eliminated.

The panel structure 10 also enables the tooling, process and assembly costs of the aircraft to be reduced substantially, due to the fact that only one forming tool 40 may be required. Current composite bodied aircraft require many separate tools and processes for the frames and shear ties, and in some cases, a separate tool is required for each frame. Additionally, most of the assembly involved with the panel structure involves the joining of "barrels" and the bonding of secondary skin if a panelized technique is used. A panelized outer skin 20 involves cold-bonding of the panels to the foam or polymer offsets 18 and the lapping of the skins to adjacent panels.

The panel structure 10 of the present invention also provides enhanced lightening strike resistance by the provision of, e.g., a 1 inch offset of the secondary skin 20 from the structural skin 14.

By now, those of skill in this art will appreciate that many modifications, substitutions and variations can be made in and to the composite aircraft structures and the methods for making them of the present invention without departing from its spirit and scope. In light of this, the scope of the present invention should not be limited to that of the particular embodiments illustrated and described herein, as they are only exemplary in nature, but instead, should be fully commensurate with that of the claims appended hereafter and their functional equivalents.

What is claimed is:

1. A composite panel structure for an aircraft, comprising:
   a plurality of annular frames disposed coaxially along a long axis of the aircraft in a spaced, parallel relationship, each frame having a hat shaped cross section;
   an inner skin having an inner surface bonded to an outer surface of the hat frames;
   a plurality of elongated stringers disposed in a longitudinal direction along an outer surface of the inner skin in a spaced, parallel relationship, each stringer having a hat shaped cross section;
   an offset bonded to an outer surface of each of the stringers; and,
   an outer skin having an inner surface bonded to an upper surface of each of the offsets.

2. The composite panel structure of claim 1, wherein each frame comprises:
   a circumferential inner chord;
   a pair of circumferential risers, each extending at an angle from a respective opposite side of the inner chord; and,
   a pair of circumferential flanges, each extending longitudinally from an outer end of a respective riser and in a direction opposite to the other flange, and
   wherein the inner surface of the inner skin is bonded to an outer surface of each of the circumferential flanges of each frame.

3. The composite panel structure of claim 1, wherein each stringer comprises:
   a longitudinal outer chord;
   a pair of longitudinal risers, each extending at an angle from a respective opposite side of the outer chord; and,
   a pair of longitudinal flanges, each extending circumferentially from an inner end of a respective riser and in a direction opposite to the other flange, and
   wherein the offsets are respectively bonded to an outer surface of the outer chord of a respective stringer.

4. The composite panel structure of claim 1, wherein the inner skin functions to carry substantially the entire design load of the structure.

5. The composite panel structure of claim 1, wherein the outer skin functions as the aerodynamic surface of the aircraft, to provide impact resistance, and to protect the aircraft against lightning strikes.

6. The composite panel structure of claim 1, wherein each of the offsets comprises a rigid, closed-cell foam material, or a solid high loss factor polymer material.

7. The composite panel structure of claim 1, wherein the offsets are bonded to the stringers and the outer skin is bonded to the offsets with an adhesive.

8. The composite panel structure of claim 1, wherein each of the offsets comprises a uniform thin layer or incorporates a web-like pattern.

9. The composite panel structure of claim 1, wherein the offsets further comprise columns disposed between the stringers and having opposite ends, at least one of which is bonded to an adjacent one of the inner and the outer skins with an adhesive.

10. The composite panel structure of claim 1, wherein longitudinal flanges of the stringers overlap circumferential flanges of the frames on opposite sides of the inner skin at a plurality of locations thereon, and further comprising a fastener extending through the overlapping flanges and the inner skin at each such location.

11. The composite panel structure of claim 1, further comprising a layer of fiberglass insulation disposed between the inner and outer skins and adjacent pairs of the stringers.

12. The composite panel structure of claim 1, wherein each of the frames comprises alternating bands of zero and ±45 degree prepreg tape.

13. The composite panel structure of claim 1, wherein each of the frames comprises alternating bands of zero and ±45 degree prepreg tape.

14. An aircraft fuselage incorporating the composite panel structure of claim 1.

15. A method for repairing damage to the outer surface of the outer skin of the aircraft of claim 14, the method comprising:
   removing the damaged portion of the outer surface of the skin; and,
   cold-bonding a patch to the skin in place of the portion removed.

* * * * *